(12) United States Patent
Matsuhira

(10) Patent No.: US 8,595,482 B2
(45) Date of Patent: Nov. 26, 2013

(54) PACKET FILTERING METHOD FOR SECURING SECURITY IN COMMUNICATIONS AND PACKET COMMUNICATIONS SYSTEM

(75) Inventor: Naoki Matsuhira, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 626 days.

(21) Appl. No.: 10/642,504

(22) Filed: Aug. 18, 2003

(65) Prior Publication Data

US 2004/0205359 A1 Oct. 14, 2004

Related U.S. Application Data

(63) Continuation of application No. PCT/JP02/01434, filed on Feb. 19, 2002.

(30) Foreign Application Priority Data

Feb. 19, 2001 (JP) ................................. 2001-041746

(51) Int. Cl.
*H04L 29/06* (2006.01)

(52) U.S. Cl.
USPC ........................................................ 713/154

(58) Field of Classification Search
USPC .................................. 726/2; 713/153, 154, 201
See application file for complete search history.

(56) References Cited

U.S. PATENT DOCUMENTS

| | | | |
|---|---|---|---|
| 6,092,191 A * | 7/2000 | Shimbo et al. ................. | 713/153 |
| 6,154,839 A * | 11/2000 | Arrow et al. ................... | 713/154 |
| 6,185,680 B1 | 2/2001 | Shimbo et al. | |
| 6,359,886 B1 * | 3/2002 | Ujihara et al. ................. | 370/392 |
| 6,389,532 B1 * | 5/2002 | Gupta et al. ................... | 713/163 |
| 6,591,291 B1 | 7/2003 | Gabber et al. | |
| 6,606,706 B1 * | 8/2003 | Li ................................... | 713/162 |
| 6,636,516 B1 | 10/2003 | Yamano | |

(Continued)

FOREIGN PATENT DOCUMENTS

| | | |
|---|---|---|
| JP | 6-261057 | 9/1994 |
| JP | 9-214556 | 8/1997 |

(Continued)

OTHER PUBLICATIONS

Masaki Minami, et al., "Internet Protocol for Next Generation (IPv6)", IPSJ (Information Processing Society of Japan), SIG Technical Reports, 95-DPS-71-23, vol. 95, No. 61, ISSN 0919-6072, Jul. 13-14, 1995.

(Continued)

*Primary Examiner* — Peter Shaw
*Assistant Examiner* — Dao Ho
(74) *Attorney, Agent, or Firm* — Staas & Halsey LLP

(57) ABSTRACT

A packet filtering system able to streamline the filter conditions for filtering and to handle even IPsec, comprised of (i) a step of storing in a packet to be sent to a receiving side filtering information for use in filtering at the receiving side and sending this from the sending side and (ii) a step of receiving the packet from the sending side, detecting the filtering information stored in the packet, and use this for filtering at the receiving side. Further, this filtering information is comprised of a simple filter key.

1 Claim, 19 Drawing Sheets

(56) References Cited

U.S. PATENT DOCUMENTS

| | | | |
|---|---|---|---|
| 6,650,710 B1* | 11/2003 | Hamery et al. | 375/240.29 |
| 6,738,361 B1* | 5/2004 | Immonen et al. | 370/328 |
| 6,987,768 B1 | 1/2006 | Kojima et al. | |
| 7,292,530 B2* | 11/2007 | Christensen | 370/230.1 |
| 2002/0049899 A1* | 4/2002 | Kenworthy | 713/1 |
| 2003/0115341 A1* | 6/2003 | Sinha et al. | 709/229 |

FOREIGN PATENT DOCUMENTS

| | | |
|---|---|---|
| JP | 10-233795 | 9/1998 |
| JP | 11-161574 | 6/1999 |
| JP | 11-205388 | 7/1999 |
| JP | 2000-59357 | 2/2000 |
| JP | 2000-261487 | 9/2000 |
| JP | 2000-270025 | 9/2000 |
| JP | 2000-349851 | 12/2000 |

OTHER PUBLICATIONS

Notice of Reasons for Rejection dated Jul. 3, 2006.
Japanese Office Action mailed Nov. 14, 2006 for corresponding Japanese Patent Application No. 2006-162880.
Japanese Patent Application mailed Nov. 14, 2006 for corresponding Japanese Patent Application No. 2006-246085.
M. Minami et al. "Internet Protocol for Next Generation (IPv6)" research report (Jul. 14, 1995) (misidentified in the translation of the Notice of Reasons for Rejection submitted on Feb. 14, 2007 but correctly identified in the Notice submitted herewith).
Corrected Notice of Reasons for Rejection issued in Japanese Patent Application No. 2006-246085.
Japanese Office Action issued on Feb. 10, 2009 in corresponding Japanese Patent Application 2006-17598.
Kawasaki, Shinsuke, "Mitsubishi Shoji 20 sha o Musubu Extra Net Nisnsho-Angoka ha Gaibu ni Itaku", Nikkei Communication, No. 288, pp. 131-136; Nikkei Business Publications, Inc., Feb. 15, 1999.

* cited by examiner

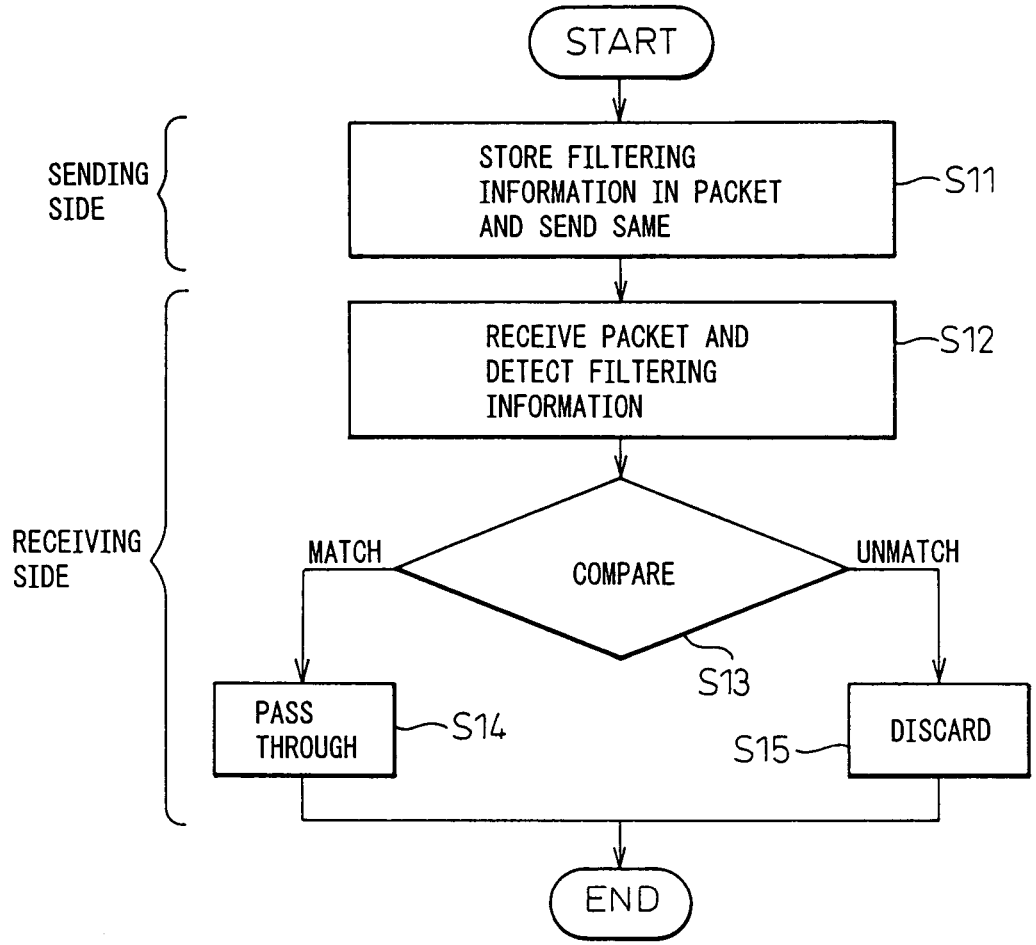
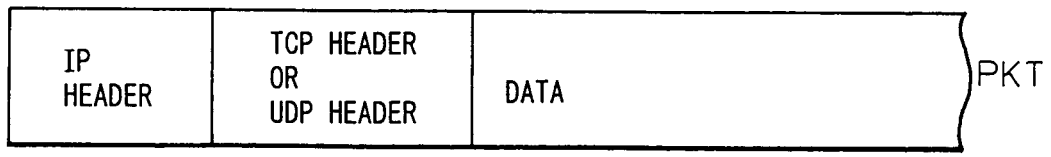

Fig.22

| | MASK FOR DESTINATION IP ADDRESS | SOURCE IP ADDRESS | MASK FOR SOURCE IP ADDRESS | DESTINATION PORT NUMBER | SOURCE PORT NUMBER |
|---|---|---|---|---|---|
| ⟨1⟩ DESTINATION IP ADDRESS | MASK FOR DESTINATION IP ADDRESS | SOURCE IP ADDRESS | MASK FOR SOURCE IP ADDRESS | DESTINATION PORT NUMBER | SOURCE PORT NUMBER |
| ⟨2⟩ DESTINATION IP ADDRESS | MASK FOR DESTINATION IP ADDRESS | SOURCE IP ADDRESS | MASK FOR SOURCE IP ADDRESS | DESTINATION PORT NUMBER | SOURCE PORT NUMBER |
| ...... | ...... | ...... | ...... | ...... | ...... |
| ⟨k⟩ DESTINATION IP ADDRESS | MASK FOR DESTINATION IP ADDRESS | SOURCE IP ADDRESS | MASK FOR SOURCE IP ADDRESS | DESTINATION PORT NUMBER | SOURCE PORT NUMBER |

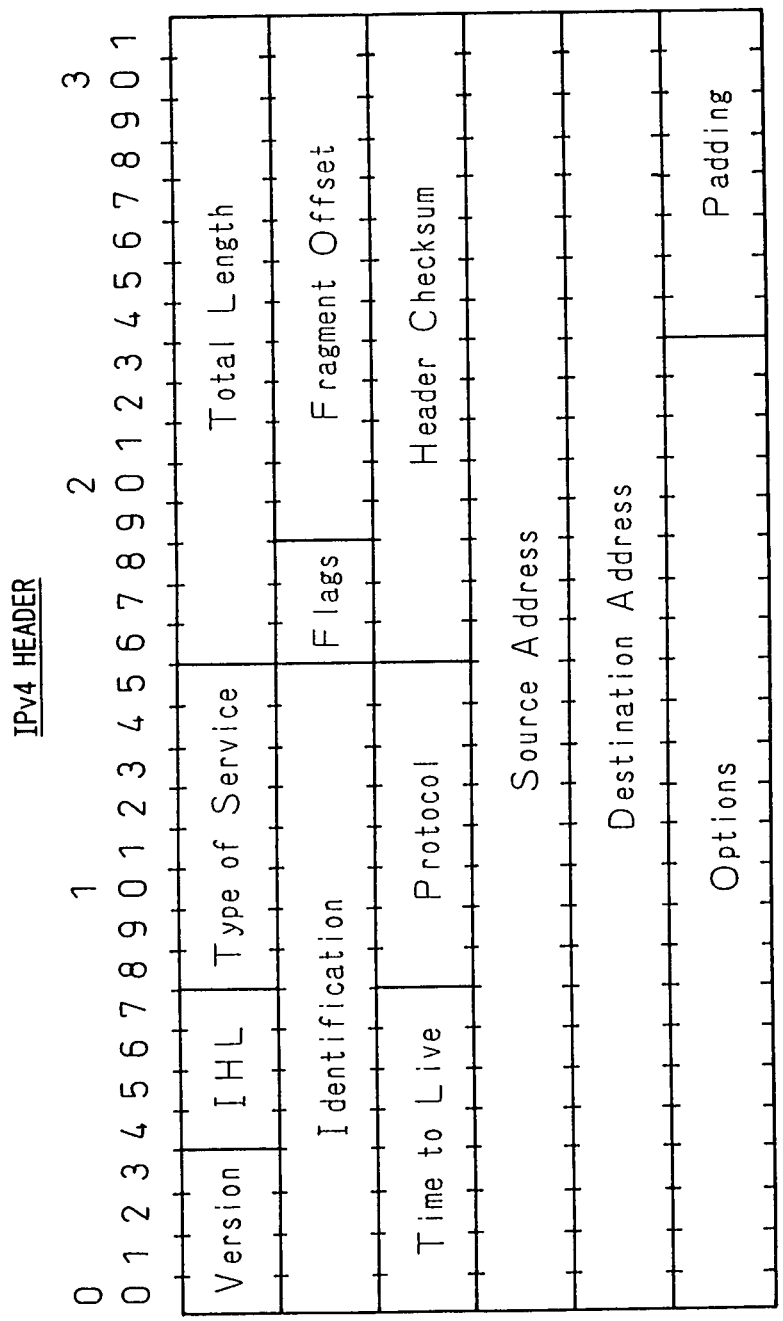

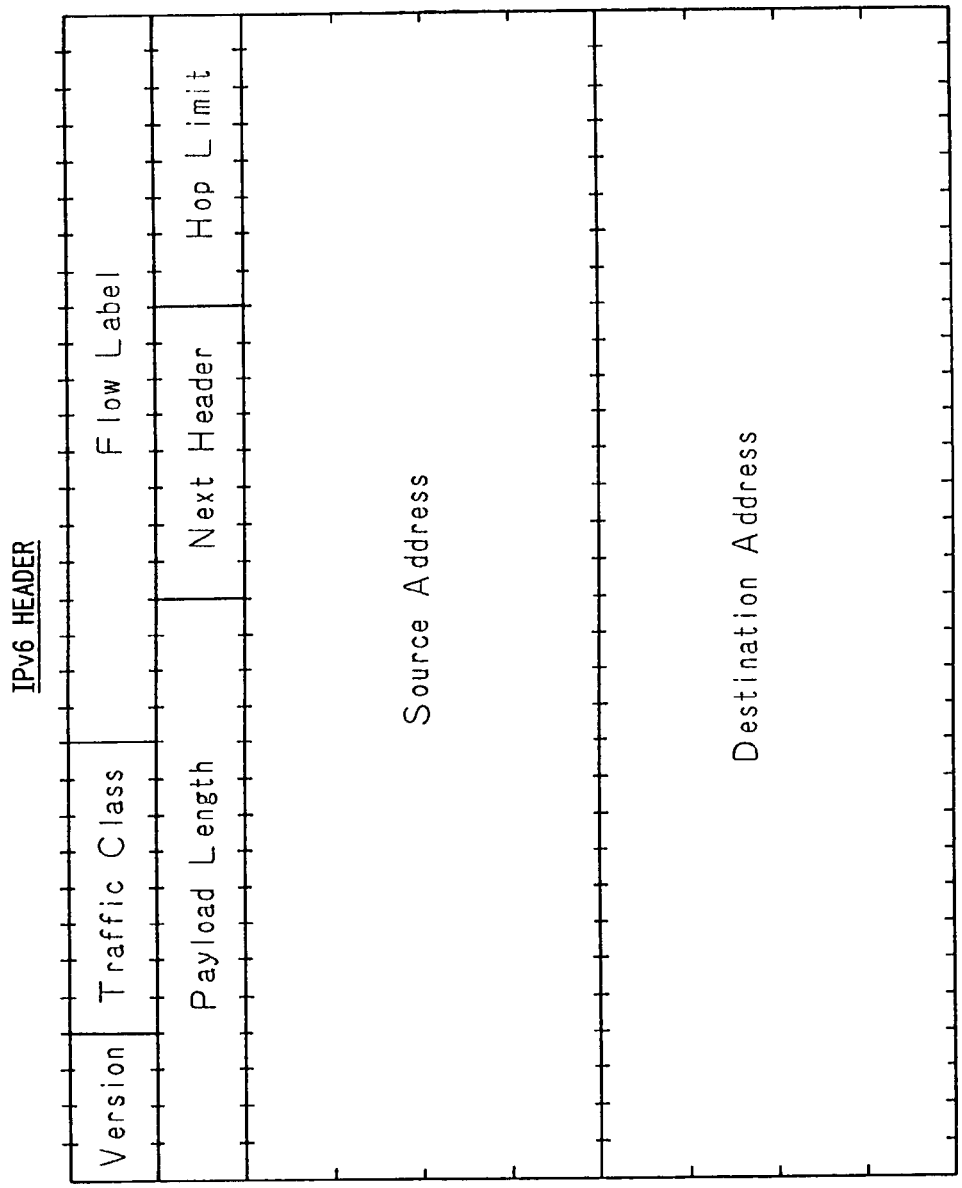

PACKET FILTERING METHOD FOR SECURING SECURITY IN COMMUNICATIONS AND PACKET COMMUNICATIONS SYSTEM

CROSS-REFERENCE TO RELATED APPLICATION

This application is a continuation application and is based upon PCT/JP02/01434, filed on Feb. 19, 2002.

TECHNICAL FIELD

The present invention relates to a packet filtering method for securing security in communications over the Internet, communication equipment and an authentication apparatus for the same, and a packet communication system

BACKGROUND ART

Filtering technology is technology for restricting unsuitable access from the Internet or to the Internet when a company etc. connects to the Internet. Normally, the filtering technology is mounted as a filtering means in the firewall or router or host or other communication equipment. This filtering means judges whether each packet access from the Internet at the company etc. (or vice versa) matches with a predetermined restrictive condition and when matching it discards that packet.

For example, the private address used in an intranet of a company etc. is an address which can be freely used only inside the company, so having a packet including such an address transferred on the Internet would be unsuitable and therefore that packet is discarded by the above filtering means. Alternatively, a specific port number is designated for a specific application, and only packets including that port number are allowed to be accessed by the filtering means.

FIG. 20 is a view schematically showing a network covered by the present invention.

In the figure, the left side shows the Internet constructed by ISPs (Internet service providers), while the right side shows a company network such as an intranet. Further, communication equipment is arranged at their boundary. The present invention mainly covers this communication equipment.

Note that the above term "communication equipment" in the present invention is a general term for the above-mentioned firewall or router or host. Packet filtering is performed in this communication equipment.

FIG. 21 is a view of the general configuration of conventional communication equipment, and FIG. 22 is a view showing in detail a comparing table 12 of FIG. 21.

In FIG. 21, reference numeral 10 is the above communication equipment. Specifically, it is a router or a host.

The communication equipment 10 is provided with a comparing means 11 for the packet filtering. This comparing means 11 is provided with a comparing table 12. While this comparing table 12 is being referred to, whether an input (IN) packet PKT is to be passed or discarded is determined. A packet PKT for which pass through is permitted is output from OUT.

A detailed example of a comparing table 12 referred to for pass through or discard is shown in FIG. 22.

Referring to this figure, the comparing table 12 stores filter conditions (<1>, <2> . . . <k>) as a list in advance. When a packet PKT is input to the communication equipment 10, in the case of an IP (Internet Protocol), the filter conditions, that is, the "destination IP address", "source IP address", "destination port number", "source port number", etc. are checked for each packet. A packet PKT which does not match the conditions is discarded.

The "mask for destination IP address" in the comparing table 12 means that the lower n (m>n) bits in for example the destination IP address (m bits) are masked (ignored). Due to this mask, filtering is possible for a plurality of communication partners as a single group, so efficiency is good. The "mask for source IP address" in the table 12 is also used for a similar purpose.

The object of the filter condition designated at the comparing table 12 is usually information described in the header of each packet. Actual examples are shown below for such a header.

FIG. 23 is a view of the format showing the actual content of an IPv4 header,

FIG. 24 is a view of the format showing the actual content of an IPv6 header,

FIG. 25 is a view of the format showing the actual content of a TCP header, and

FIG. 26 is a view of the format showing the actual content of a UDP header.

Referring to the IPv4 (IP Version 4) header of FIG. 23, the source IP address is checked by the "Source Address", while the destination IP address is checked by the "Destination Address".

The IPv6 (IP Version 6) header of FIG. 24 is similar to the case of FIG. 23.

The TCP (transmission control protocol) header of FIG. 25 functions as an upper layer above the IP, but in the same way as above, the source port number is checked by the "Source Port", while the destination port number is checked by the "Destination Port". Note that this "Destination Port" often designates a specific application.

The UDP (user datagram protocol) header of FIG. 26 is also similar to the case of FIG. 25 explained above.

According to the conventional comparing means 11 (FIG. 21) explained above, the following problems arise: First, as the number of communication partners increases more and more in the future, the number of filter conditions will also increase. That is, the number of entries to the comparing table 12 will end up increasing and the filtering time will increase together with the increase in the hardware.

Second, there is the problem that when introducing IPsec (IP Security) protocol expected to increase in usage in the future, the above-mentioned upper layer TCP headers or UDP headers will end up being encrypted by the IPsec, so filtering using the "Source Port" and "Destination Port" shown in FIG. 25 and FIG. 26 will no longer be possible.

Further, ancillary to this, in so-called "peer-to-peer" type applications where the port number is dynamically determined by negotiation like the VoIP (Voice over IP), the above filtering is not possible by static settings. As a result, to secure security, it is necessary to filter all VoIP packets, so there is the problem that VoIP cannot in fact be used.

DISCLOSURE OF THE INVENTION

In view of the above problems, the present invention has as its object to provide a packet filtering method able to greatly reduce the number of entries of filter conditions and to handle even IPsec and communication equipment for the same.

To achieve this object, the present invention provides a packet filtering system able to streamline the filter conditions for filtering and to handle even IPsec. Further, this method is comprised of:

(i) a step of storing filtering information for use in filtering at the receiving side in a packet to be sent to a receiving side and sending this from the sending side and (ii) a step of receiving the packet from the sending side, detecting the filtering information stored in the packet, and use this for filtering at the receiving side. Further, this filtering information is comprised of a simple filter key.

BRIEF DESCRIPTION OF DRAWINGS

FIG. 1 is a flow chart of a packet filtering method according to the present invention, FIG. 2 is a view of a general packet including a TCP/UDP header, FIG. 22 is a view showing in detail a comparing table 12 of FIG. 21, FIG. 23 is a view of the format showing the actual content of an IPv4 header, FIG. 24 is a view of the format showing the actual content of an IPv6 header.

BEST MODE FOR CARRYING OUT THE INVENTION

Figure 3:
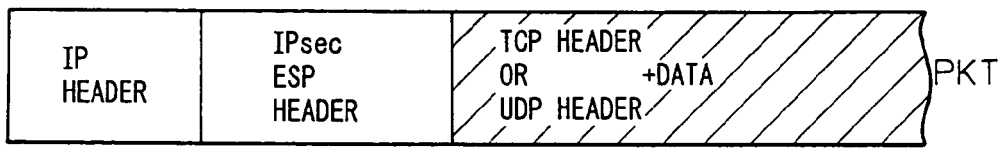
FIG. 3 is a view of a general packet employing IPsec.

FIG. 1 is a flow chart of a packet filtering method according to the present invention.

What particularly characterize the present invention at steps S11 to S15 shown in the figure are steps S11 and S12.

Step S11: Filtering information for use in filtering at the receiving side is stored in a packet to be sent to the receiving side and sent from the sending side.

Step S12: The packet from the sending side is received and the filtering information stored in the packet is detected and used for filtering at the receiving side.

The filtering operation (S13 to S15) at the receiving side is substantially the same as in the past.

Step S13: The receiving side holds the filtering information of the receiving side determined in advance and compares the filtering information of the sending side detected from the packet with the filtering information of the receiving side.

Step S14: If the result of the comparison is that the two match, the packet is allowed to pass.

Step S15: If the result of the comparison is that the two do not match, the packet is discarded.

As explained above, the present invention determines the filter conditions using newly defined filtering information. The codes forming the filtering information will hereinafter be called the "filter key" in the present invention.

The present invention uses the simple filter key, instead of filter data serving as the troublesome filter conditions of the past shown in FIG. 22, or together with the conventional filter data. Further, this filter key is used for the above comparison.

The major difference from the past is that, while the convention a filter conditions is determined unambiguously for a user (uniquely), in the present invention, the filter conditions (filter key) are embedded in the packet itself without designating the user.

Therefore, it becomes possible to secure security, for example, by assigning a single common filter key between a materials purchasing department of one manufacturer and a subcontracting manufacturer liaising with and exclusively delivering materials to that department, embedding this common filter key in communication packets between the two, and performing the filtering. This results in a major reduction in the amount of the filter conditions.

In this way, the present invention realizes the desired filtering by embedding a specific filter key predetermined between communicating partners into each packet used for that communication. In this case, however, there is the problem as to where, in the packet, the filter key should be stored.

To solve this problem, the present invention adopts the following technique for storage of the filter key so as to simultaneously solve the above-mentioned second problem, that is, the TCP header or UDP header being encrypted by the IPsec and thus the filtering becoming impossible. The background leading to this storage technique will be explained step by step along with the following drawings.

FIG. 2 is a view of a general packet including a TCP/UDP header.

In the figure, the IP header is placed at the head of the packet PKT, then the TCP header (or UDP header) is placed, then finally the inherent data follows.

FIG. 3 is a view of a general packet employing IPsec.

If adopting IPsec for the packet PKT of FIG. 2, the IPsec ESP (Encapsulating Security Payload) header is placed right after the IP header, the following TCP header (or UDP header) and data end up being encrypted (shown by hatching), and the above-mentioned second problem is caused.

Figure 4:
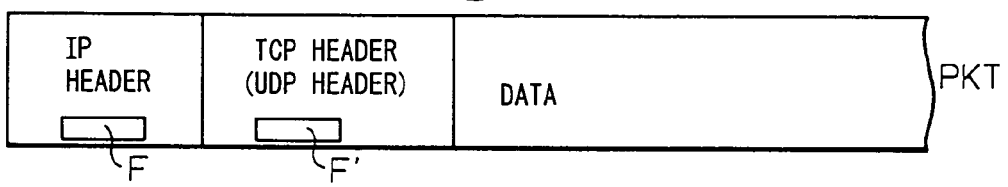
FIG. 4 is a view of a packet in the case of use of conventional filtering.

FIG. 4 is a view of a packet in the case of use of conventional filtering.

The filter conditions explained in FIG. 22 are set at F (for IP header) or F' (for TCP or UDP header) in the packet PKT.

Figure 5:
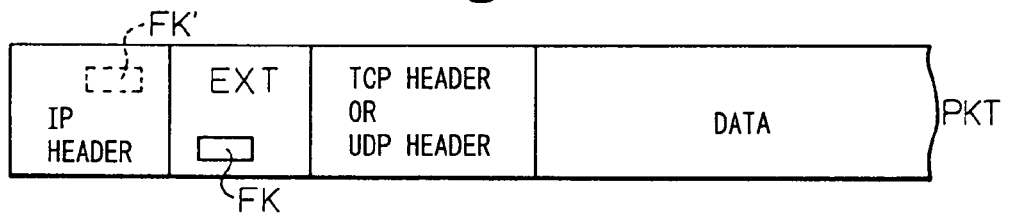
FIG. 5 is a view of a packet storing a filter key based on the present invention.

FIG. 5 is a view of a packet storing a filter key based on the present invention.

This packet is a packet in compliance with IPv6. The filter key FK is stored in the IPv6 extended header (EXT). Alternatively, this EXT is formed as a filter key header.

Further, the filter key FK' (shown by broken lines) is stored in a flow label region in the IPv6 header. This flow label region is already shown as "Flow Label" at the top right of FIG. 24 (IPv6 header) explained above. The method of use of this region has not yet been decided.

Figure 6:
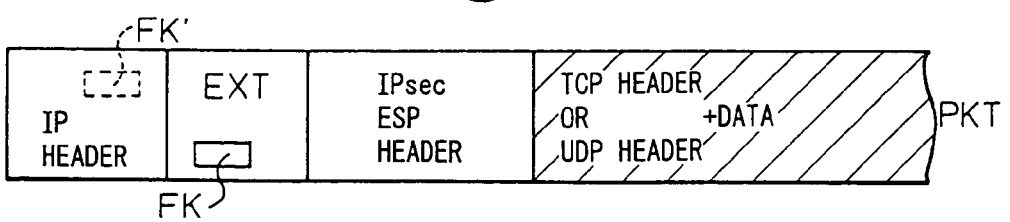
FIG. 6 is a view of a packet in the case of employing IPsec in a packet of the present invention shown in FIG. 5.

FIG. 6 is a view of a packet in the case of employing IPsec in a packet of the present invention shown in FIG. 5.

As clear from this figure, even if the TCP header (or UDP header) is encrypted by the IPsec, the filter key FK will not be affected at all. The IPv6 extended header where this filter key FK is stored or formed as a filter key header will be illustrated next.

Figure 7:
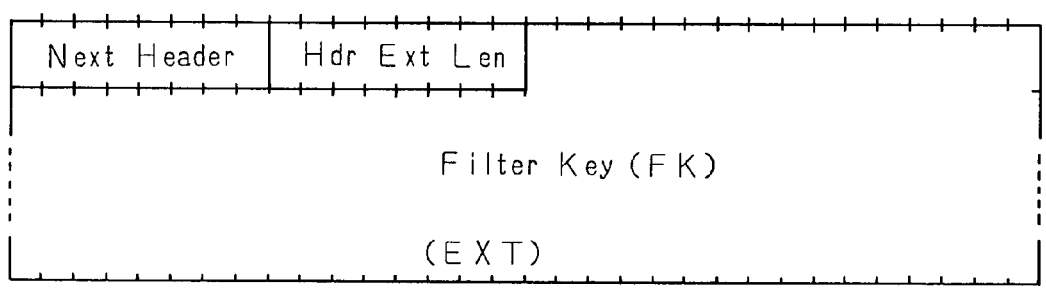
FIG. 7 is a view of the format of the actual content of an IPv6 extended header.

FIG. 7 is a view of the format of the actual content of an IPv6 extended header.

This IPv6 extended header is based on the option format of IPv6.

As shown in the figure, the IPv6 extended header EXT is arranged, in the format, after the IPv6 header shown in FIG. 24. Further, it is possible to connect a plurality of EXT's in series. Therefore, the IPsec encrypted header shown in FIG. 6 can also be placed as one of the plurality of EXT's. The boundary with the next EXT is known by "Hdr Ext Len" (EXT length) in FIG. 7.

The filter key FK can be stored in one of the EXT's or the EXT itself can be used as a filter key header.

If first detecting the "Next Header" shown in FIG. 24, the address of the extended region where the filter key is stored is written there. If accessing the address, the target filter key (FK) is shown as shown in FIG. 7. Note that how to use this extended region is left to the user.

Summarizing the matters explained above with reference to the drawings from FIG. 2 on, the result is the following:

(i) When the packet PKT is a packet in compliance with IPv6, the filtering information (filter keys FK, FK') are stored in the IPv6 header portion.

(ii) When the packet PKT is a packet in compliance with IPv6, the filtering information (filter key FK) is stored in the IPv6 extended header EXT added to this IPv6 header.

(iii) When the packet PKT is a packet in compliance with IPv6, the filtering information (filter key FK') is stored in the flow label region in the IPv6 header.

Figure 8:
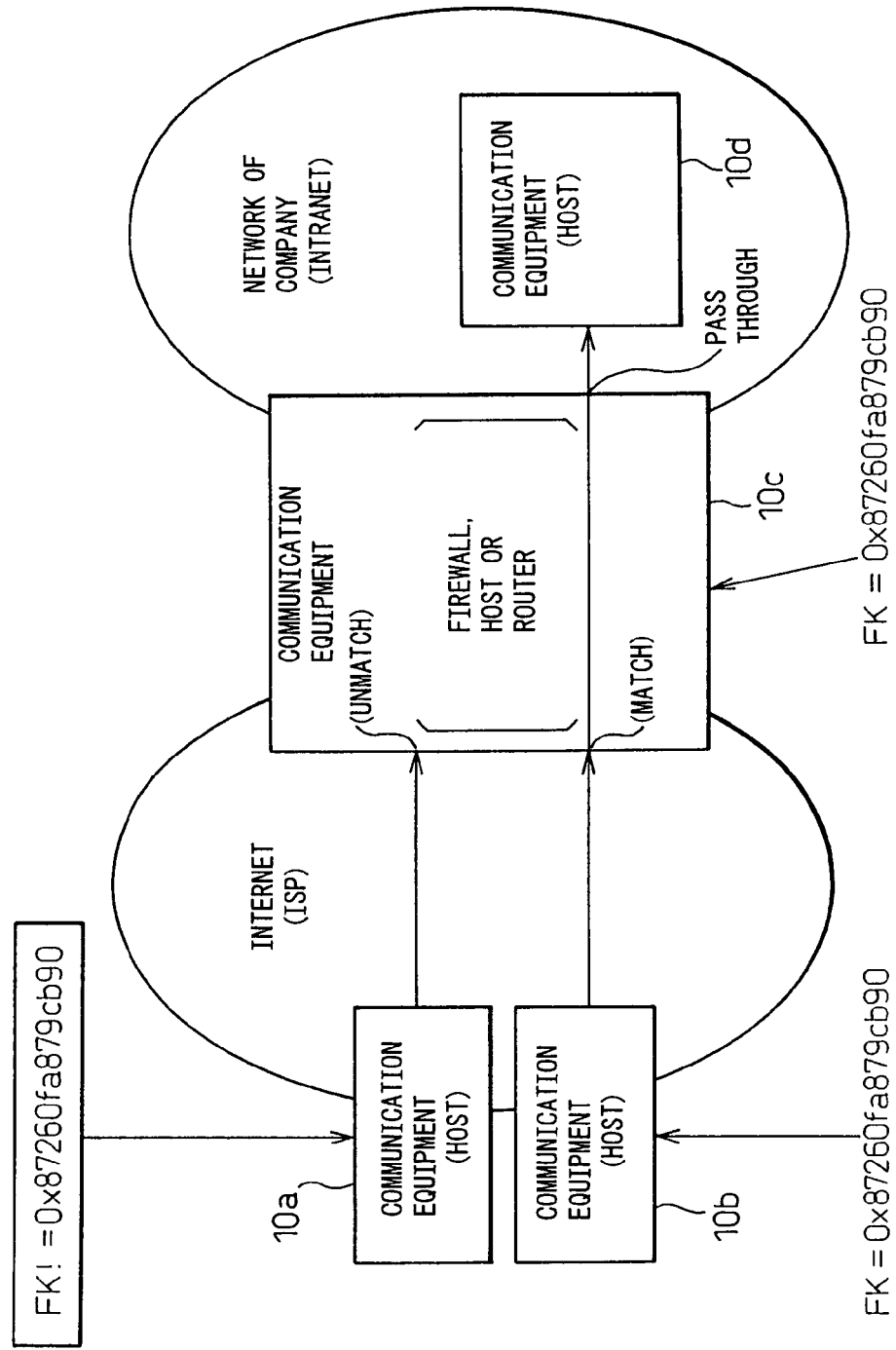
FIG. 8 is a view illustrating a network to which the present invention is applied.

FIG. 8 is a view illustrating a network to which the present invention is applied.

Figure 20:
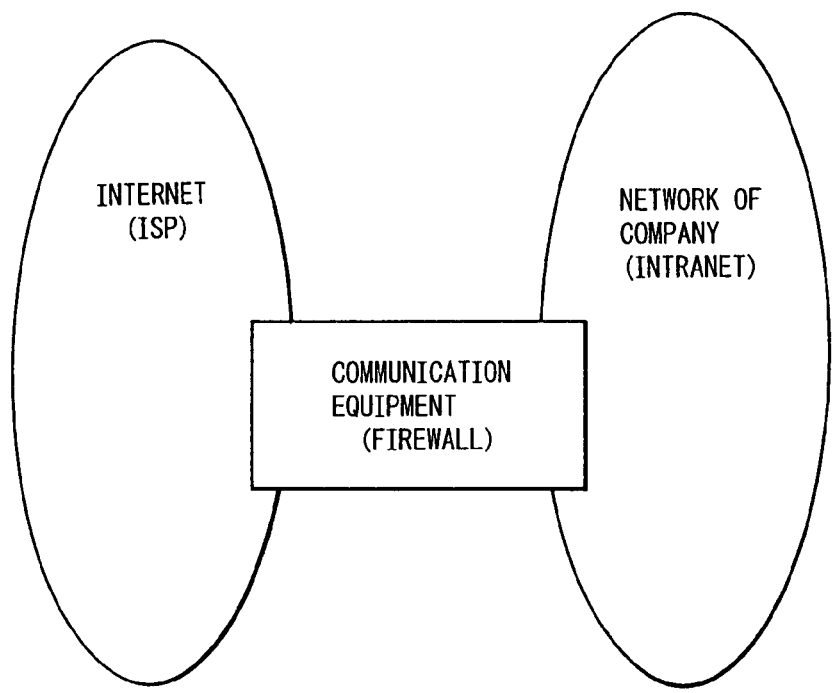
FIG. 20 is a view briefly showing a network covered by the present invention.
Figure 21:
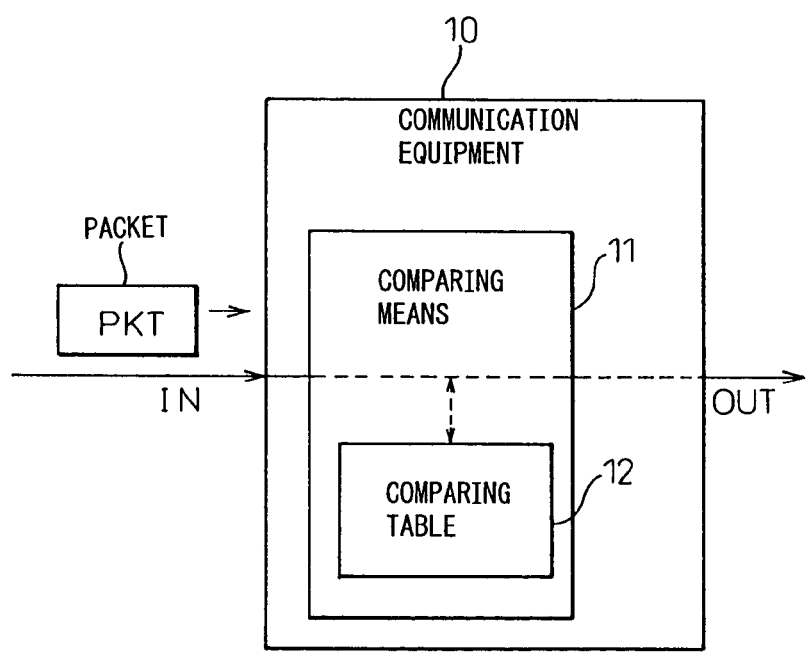
FIG. 21 is a view of the general configuration of a conventional communication equipment.

That is, the configuration where the present invention is applied to the network shown in FIG. 20 is illustrated. Therefore, the communication equipment 10a to 10d are further drawn.

In this figure, as the filter key FK, FK=0x87260fa879cb90 is used (however, this is just an example). That is, the communication equipment 10c which is placed at the boundary of one network (Internet) and another network (intranet) holds this FK in advance.

Assume that the communication equipment 10a and 10b send predetermined packets to the communication equipment 10d.

At this time, the above filter key FK is stored in the series of packets from the communication equipment 10b. Therefore, the FK matches with the filter key held in the communication equipment 10c. The packets can therefore pass through the equipment 10c and reach the communication equipment 10d.

On the other hand, the filter key FK stored in the series of packets from the communication equipment 10a are different from the above FK (in the figure, shown with "!" mark, where "!" means "NOT"). Therefore, the series of packets from the equipment 10a are judged to mismatch in filter key at the communication equipment 10c and are discarded. Note that the comparing means for performing this judgement is shown in the later explained FIG. 9. Here, refer once to FIG. 27.

Figure 27:
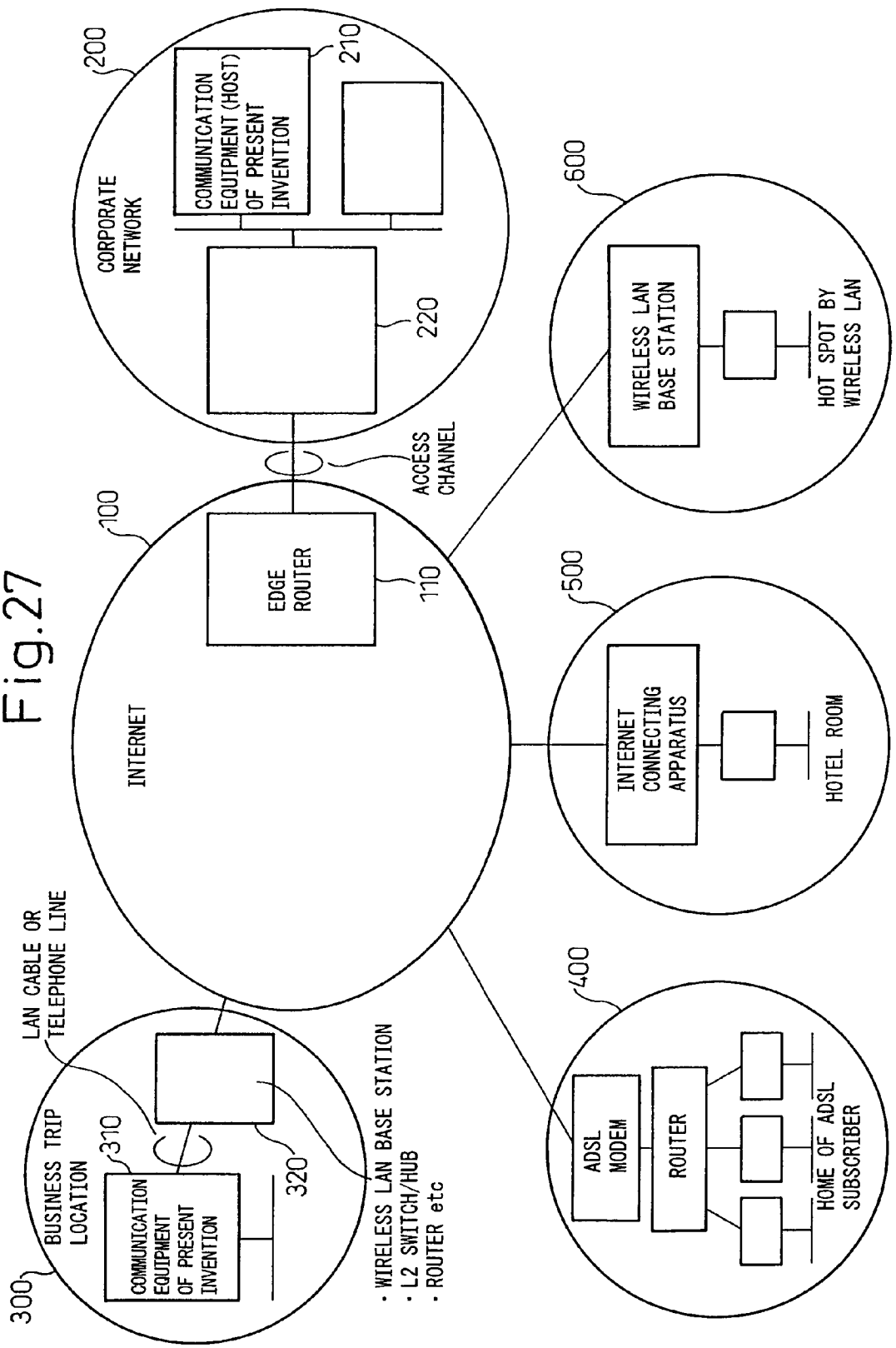
FIG. 27 is a view of a specific network to which the present invention is applied.

FIG. 27 is a view of a specific network to which the present invention is applied. A corporate network 200 is comprised of communication equipment (host) 210 having the functions of the present invention plus a router 22 connected to an access channel for accessing an edge router 110 of the Internet 100. On the other hand, at a business trip location 300, communication equipment 310 to which the present invention is applied is placed via a router 320 (or wireless LAN base station, L2 switch, hub, ADSL modem, media converter, etc.) connected to the Internet 100 through a LAN cable or phone line. This communication equipment 310 may be a laptop PC as well. In this case, data communications card of a PHS, PDC or W-CDMA is used.

Still further, the Internet 100 can be accessed by communication equipment to which the present invention is applied from a general home 400, a hotel room 500, or a hot spot 600 by a wireless LAN. Note that it is also possible to apply the present invention to a router 220 in a corporate network 200. In this case, the router 220 can manage the filter keys of a plurality of communication equipment in the company, so operation of not applying the present invention to the communication equipment 210 etc. is also possible.

Figure 9:
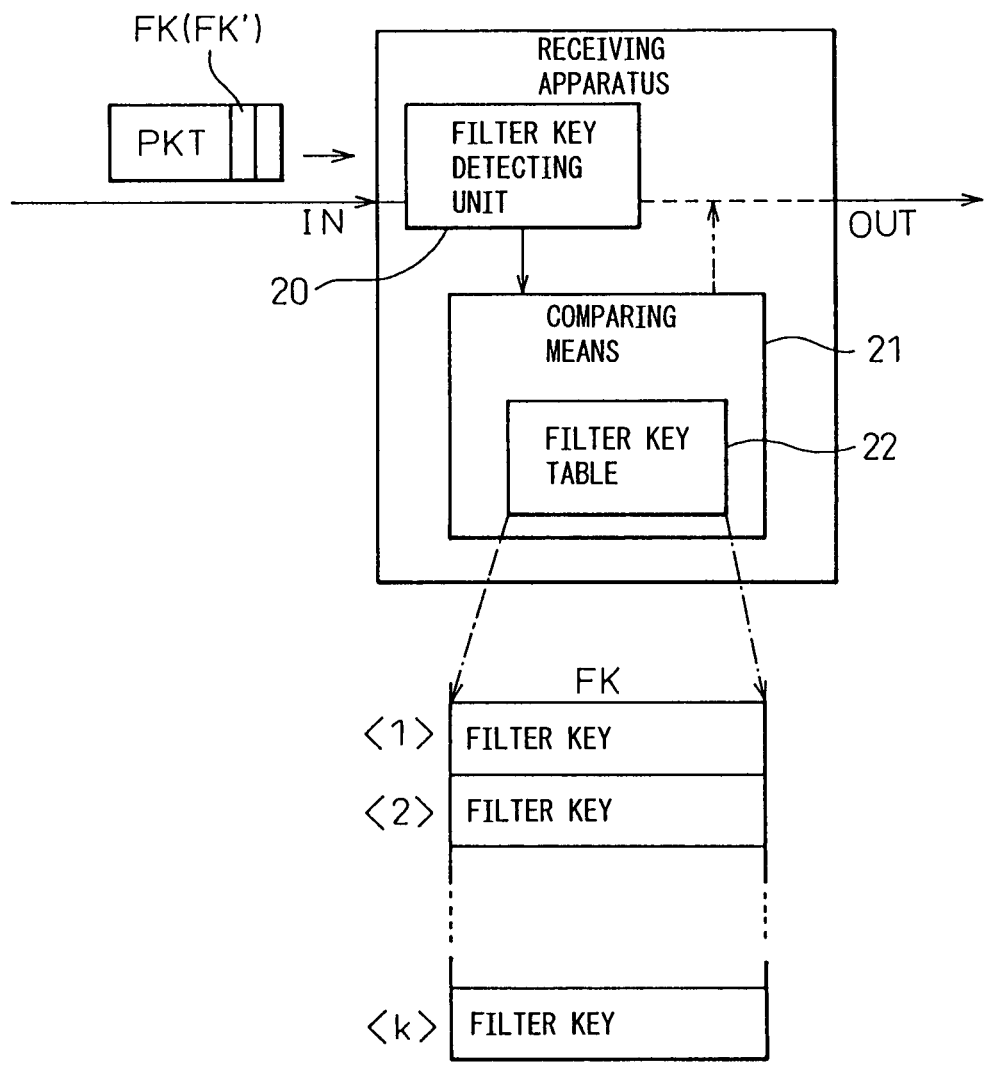
FIG. 9 is a view of the basic configuration of communication equipment at a packet receiving side based on the present invention.

FIG. 9 is a view of the basic configuration of communication equipment at a packet receiving side based on the present invention. That is, the communication equipment 10 of this figure is communication equipment of the packet receiving side including means for achieving packet filtering, for example, a router or host. This communication equipment is provided with a filter key detecting unit 20 which receives the packet PKT sent from the sending side which, stores freely determined filtering information as the filter key FK in a header portion of the packet PKT, and detects a filter key FK from this header portion.

Further, it is provided with a comparing means 21 for comparing the filter key of the sending side detected by the filter key detecting unit 20 with the filter key of the receiving side held in advance, judges if the two match, and when they do not match instructs that the received packets be discarded.

This comparing means 21 has a filter key table 22 for holding filter keys FK in the form of a list.

Figure 10:
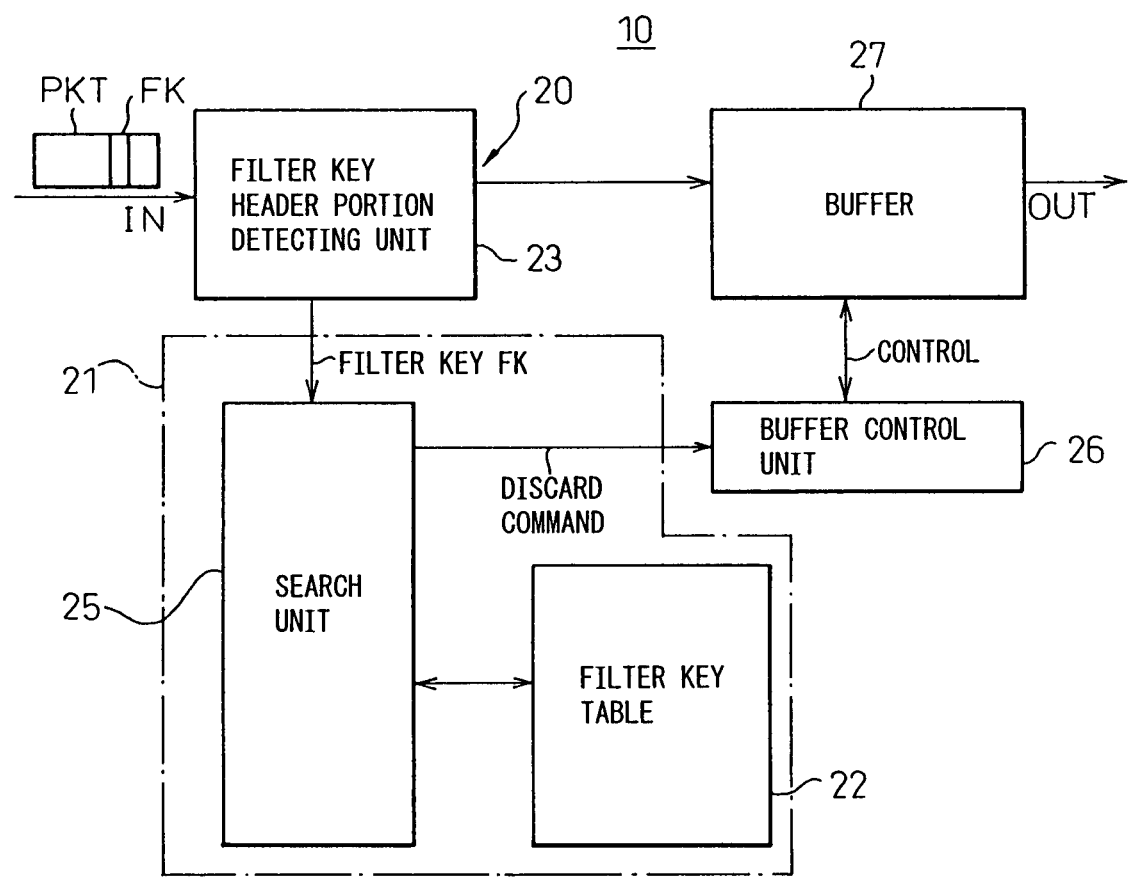
FIG. 10 is a view of a first specific example of communication equipment of FIG. 9.

FIG. 10 is a view of a first specific example of communication equipment of FIG. 9.

The communication equipment 10 of this first specific example is provided with a buffer 27 for temporarily storing received packet PKT passing through a filter key header detecting unit 23 which forms the above-mentioned filter key detecting unit 20. Here, the above-mentioned comparing means 21 is comprised of:

a filter key table 22 for holding a predetermined plurality of different filter keys FK (<1>, <2> . . . <k>), a search unit 25 for searching for whether there is a filter key matching with the filter key detected by the filter key header detecting unit 23 in the filter key table 22 and when there is none, outputting a discard command, and a buffer control unit 26 for receiving the discard command and controlling the system so that the packets stored in a buffer 27 are discarded.

Note that this first specific example shows a configuration of a case of forming a filter key header in the IPv6 extended header added to the IPv6 header when the packets PKT are packets in compliance with IPv6 (FIG. 7).

Figure 11:
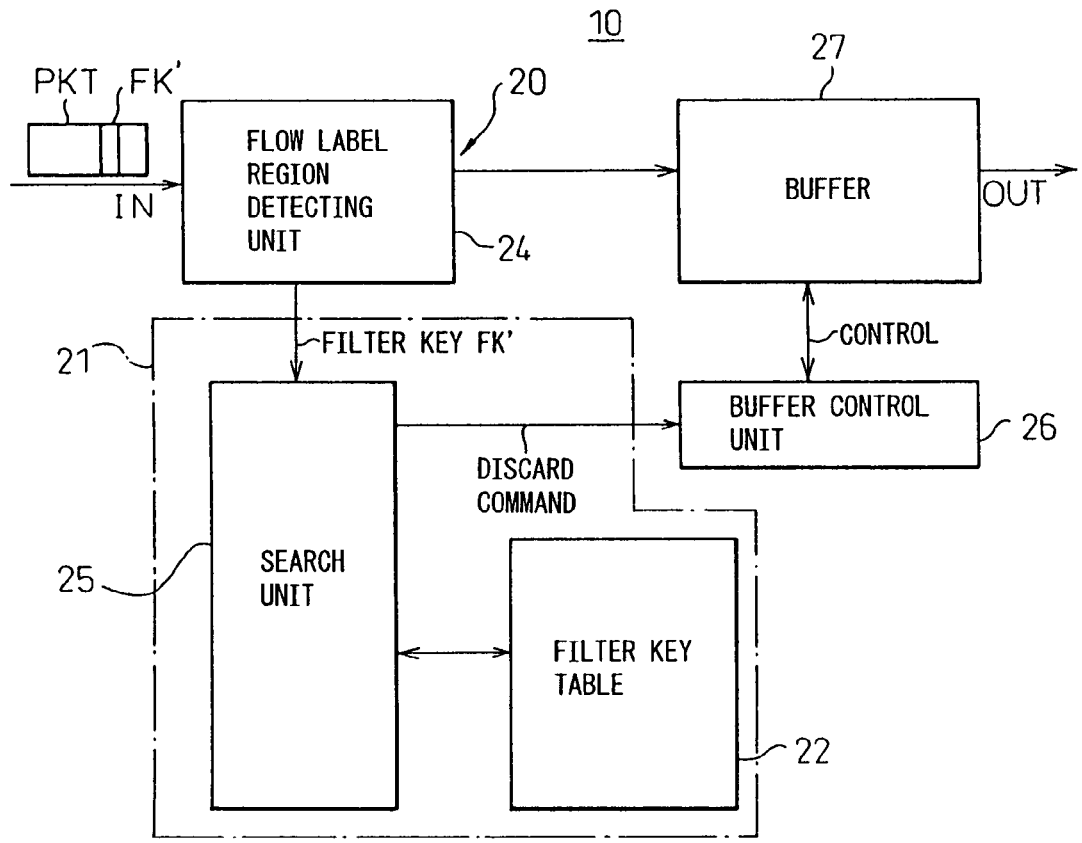
FIG. 11 is a view of a second specific example of communication equipment of FIG. 9.

On the other hand, the configuration in the case where the packets PKT are packets in compliance with IPv6 and storing the filter key FK' in the flow label region in the IPv6 header (FIG. 24) is shown in FIG. 11.

FIG. 11 is a view of a second specific example of communication equipment of FIG. 9.

The configuration of this figure is basically the same as the configuration of FIG. 10. There are two points of difference: the filter key detecting unit 20 is a flow label region detecting unit 24 and the detected filter key is FK' (code is same as FK, but stored at different location in packet). The operation is the same as in FIG. 10.

Figure 12:
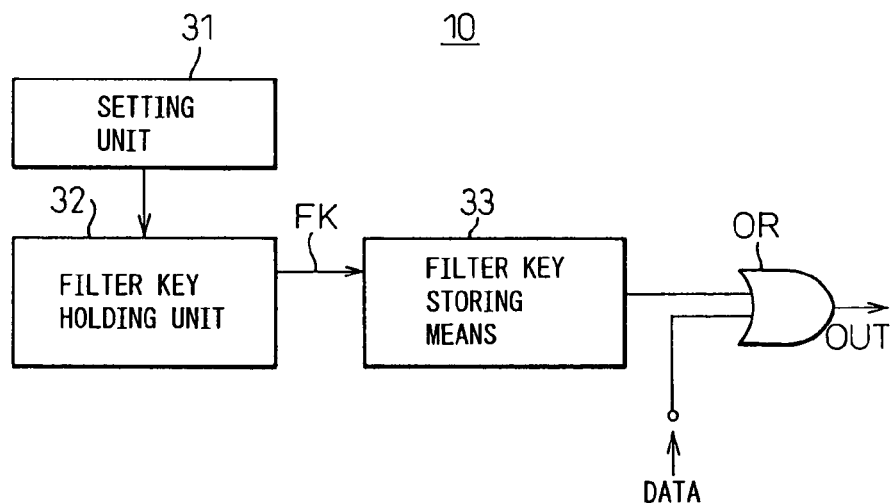
FIG. 12 is a view of the basic configuration of communication equipment of a packet sending side based on the present invention.

FIG. 12 is a view of the basic configuration of communication equipment of a packet sending side based on the present invention. That is, the communication equipment 10 of this figure is communication equipment of the packet sending side including means for achieving packet filtering, for example, a host, which is comprised of at least a setting unit 31 for setting freely determined filtering information, a filter key holding unit 32 for holding filtering information input by the setting unit 31 as a filter key FK, and a filter key storing means 33 for receiving the held filter key FK as input and storing the filter key in the header portion of a packet PKT. As the filter key, it is possible to use the port number of a TCP or UDP as they are. If used in this way, even if an IP packet is encrypted using the IP SEC ESP, filtering of the application becomes possible. Alternatively, in the case of applications where port numbers are not fixed such as VoIP, a value showing that the data is VoIP data may be determined and that value used as the filter key. By such usage, service passing only VoIP becomes possible. Note that the setting unit 31 is for example a keyboard. Codes of filter keys serving as the filtering information are input from there. The filter key may also be notified from another party by a dynamic negotiation. Further, it may be acquired from a system manager. In this case, the filter key may be updated in hour units, day units, or week units.

A specific example of the storing means 33 and its peripheral portions will be explained below.

Figure 13:
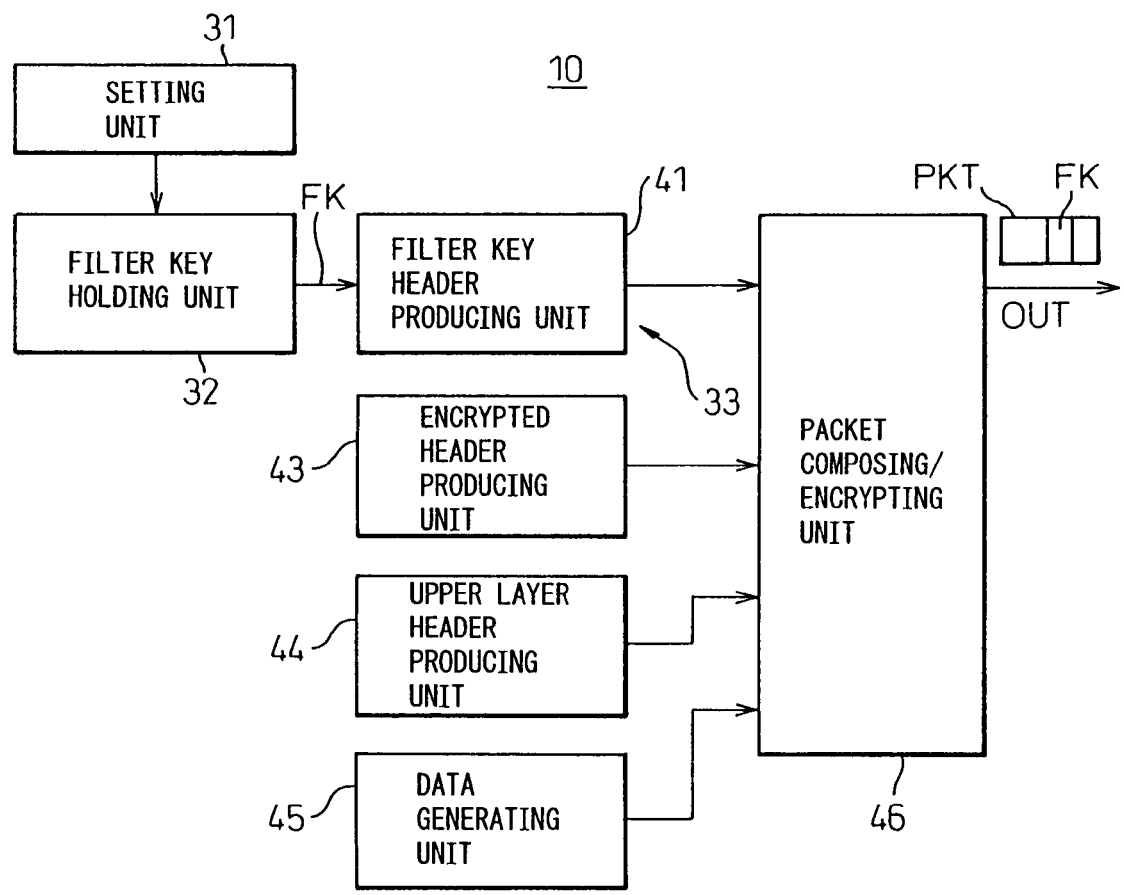
FIG. 13 is a view of a first specific example of communication equipment of FIG. 12.

FIG. 13 is a view of a first specific example of communication equipment of FIG. 12.

In the first specific example, the packets PKT are packets in compliance with IPv6 and the filter key storing means 33 is a filter key header producing unit 41 which forms a filter key header in an IPv6 extended header added to this IPv6 header. This filter key header is shown in FIG. 7.

The communication equipment 10 (for example, host) of this figure is actually provided with other peripheral portions.

First, there are an encrypted header producing unit 43 for generating an IPsec encrypted header (see FIG. 6) and an upper layer header producing unit 44 for generation of a TCP header or UDP header. Further, there is a data generating unit 45 for generating "data" shown in FIG. 12 to be transferred to the receiving side.

Further, there is a packet composing/encrypting unit 46 for receiving as input the outputs of the filter key header producing unit 41, the encrypted header producing unit 43, the upper layer header producing unit 44, and the data generating unit 45 and generating packets PKT for the receiving side. The format of the output of the packets from the packet composing/encrypting unit 46 is as shown in FIG. 6.

Figure 14:
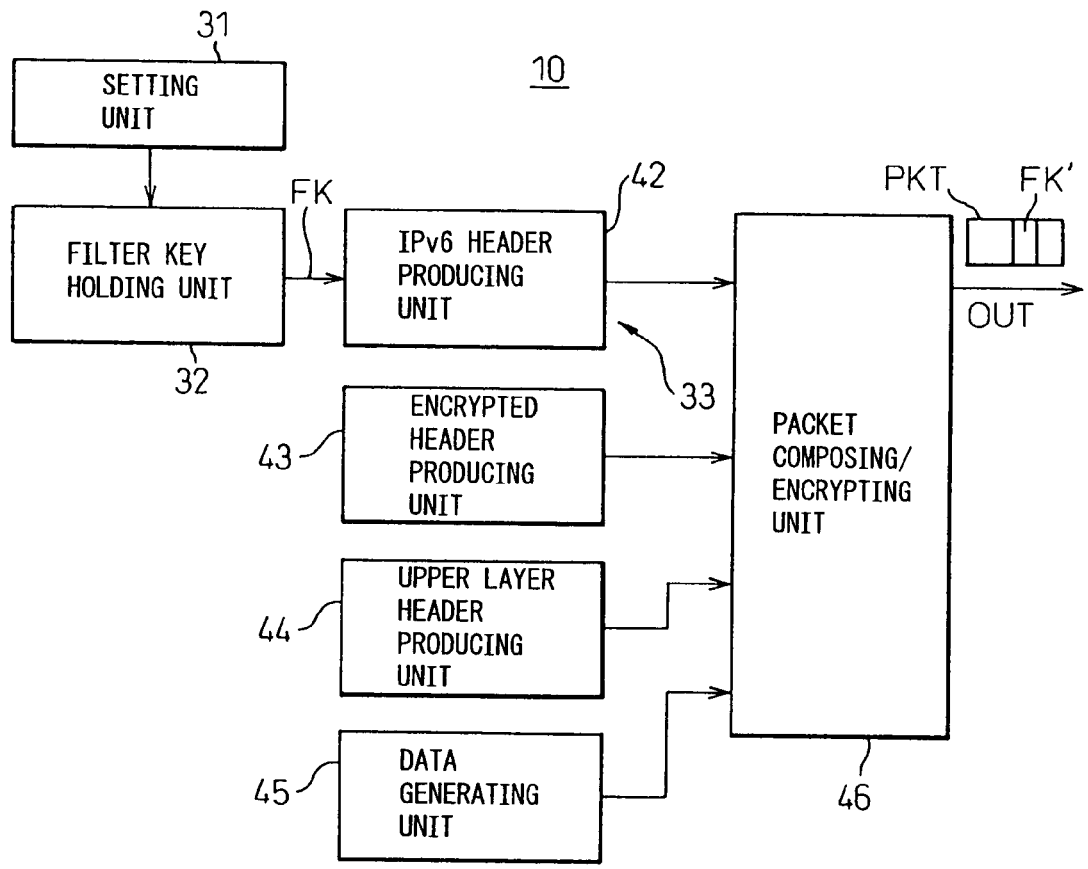
FIG. 14 is a view of a second specific example of communication equipment of FIG. 12.

FIG. 14 is a view of a second specific example of communication equipment of FIG. 12.

In this second specific example, the packets PKT are packets in compliance with IPv6 and the filter key storage unit 33 is an IPv6 header producing unit 42 which stores a filter key FK' in a flow label region in the IPv6 header. The flow label region accommodating this filter key FK' is shown as "Flow Label" in FIG. 24.

The communication equipment 10 of this figure also, like that shown in FIG. 13, has an encrypted header producing unit 43 for generating an IPsec encrypted header, an upper layer header producing unit 44 for generating a TCP header or UDP header, and a data generating unit 45 for generating data to be transferred to the receiving side and has a packet composing/encrypting unit 46 receiving, as input, the outputs from these.

Above, details of the filtering method and apparatus according to the present invention were clarified. Next, the security setup required when actually using the filtering method and apparatus according to the present invention will be explained. That is, the means of user authentication.

Figure 15:
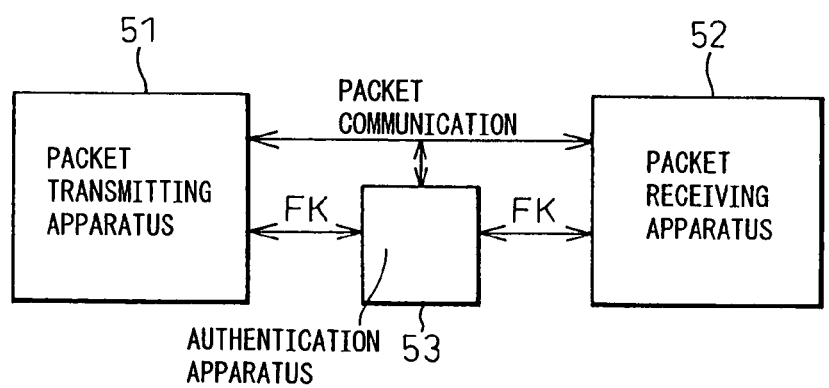
FIG. 15 is a view showing in brief a packet communication system to which the present invention is applied.

FIG. 15 is a view showing in brief a packet communication system to which the present invention is applied.

The system 50 shown in this figure is a packet communication system where transferred packets are filtered and is provided with a packet transmitting apparatus 51, a packet receiving apparatus 52, and an authentication apparatus 53.

Here, the packet transmitting apparatus 51 stores filtering information for use in filtering at the receiving side in the packets to be sent from the sending side to the receiving side for transmission. On the other hand, the packet receiving apparatus 52 receives packets from the sending side through the network between the server and client, detects the filtering information stored in the received packets, and uses it for filtering at the receiving side. Further, the authentication apparatus 53 mediating between these receives user authentication information input from a user receiving the filtering service and authenticates the user. After authentication, it assigns and distributes a filter key as filtering information corresponding to that user authentication information to that user.

This packet communication system 50 can be functionally expressed as in the following (I) and (II):

(I) The system 50 is a packet communication system providing a filtering service for packets transferred between a server and a client through a network and is provided with a first means and a second means used for access from the server or client of the user side to the network. These are:

(i) a first means for receiving user authentication information and authenticating the user and (ii) a second means for assigning and distributing a filter key as filtering information corresponding to that user authentication information to the user after the authentication.

Note that the first means and second means correspond to a filtering authentication means 61 and a filter key providing means 62 in for example the later explained FIG. 16 (same for packet communication system of later explained (II)).

According to the packet communication system 50 having the filtering function, user authentication becomes possible for access to the network. For example, access by an employee on a business trip from the business trip location through the Internet to the network of the organization to which he or she belongs becomes possible or access from a local network at the business trip location to the Internet becomes possible.

(II) The system 50 is a packet communication system providing a filtering service for packets transferred through a network between a server and client and is provided with a first means and second means used for access from a user of the network side to the server or client. These are:

(i) a first means for receiving user authentication information and authenticating a user and (ii) a second means for restricting access by assigning and distributing a filter key as filtering information corresponding to the user authentication information to the user after the authentication.

According to the packet communication system 50 having the filtering function, if the authentication for a service provided by the server is performed once at the start in hour units, day units, week units, etc., access can be restricted using the filter key without authentication thereafter.

Next, the above authentication apparatus 53 will be explained in more detail.

Figure 16:
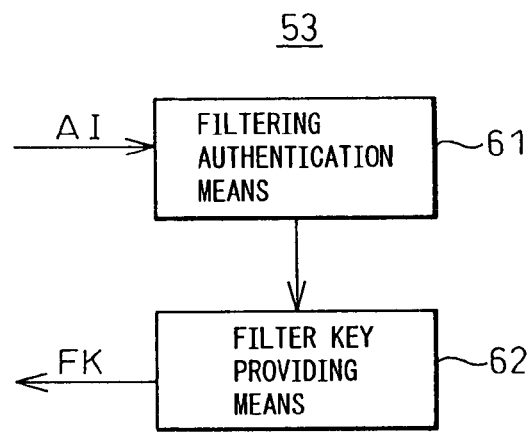
FIG. 16 is a view of the basic configuration of an authentication apparatus shown in FIG. 15.

FIG. 16 is a view of the basic configuration of an authentication apparatus shown in FIG. 15.

As shown in the figure, the authentication apparatus 53 (FIG. 15) is provided with a filtering authentication means 61 and a filter key providing means 62.

The filtering authentication means 61 receives user authentication information AI input from a user receiving the filtering service and authenticates the user. Further, the filter key providing means 62 assigns and distributes a filter key FK as filtering information corresponding to the user authentication information to the user after the authentication at the filtering authentication means 61.

Figure 17:
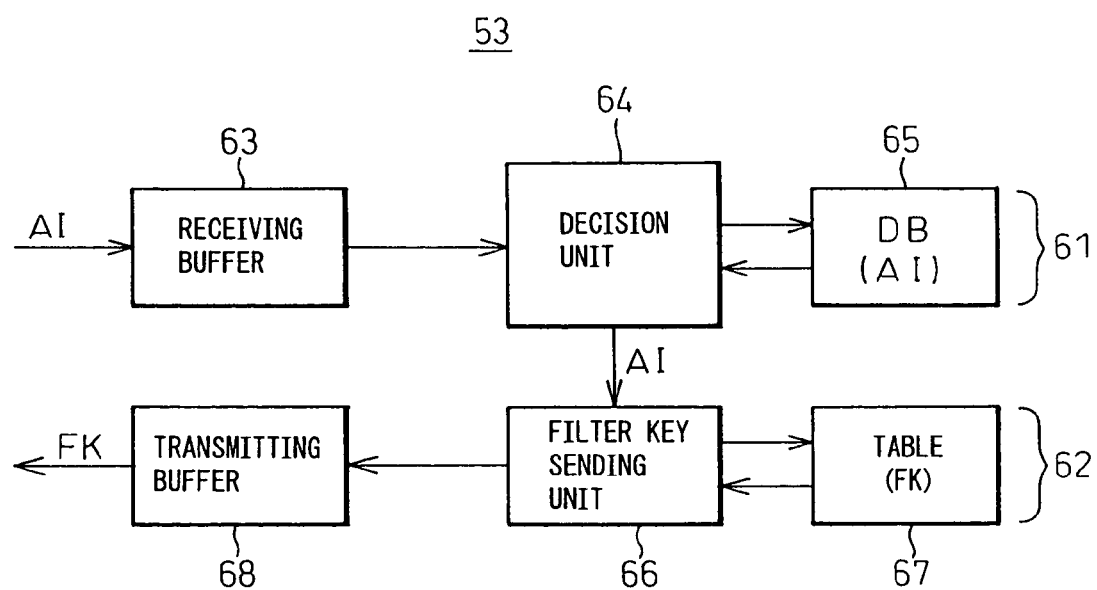
FIG. 17 is a view of a specific example of the configuration of an authentication means shown in FIG. 16.

FIG. 17 is a view of a specific example of the configuration of an authentication means shown in FIG. 16.

The top side of the configuration in the figure corresponds to the filtering authentication means 61 of FIG. 16, while the bottom side corresponds to the filter key providing means 62.

That is, the filtering authentication means 61 is comprised of a user authentication database (DB) 65 in which the user authentication information AI is registered in advance and a decision unit 64 for determining the veracity of the user authentication information AI input to and buffered by a receiving buffer 63 by referring to the user authentication database 65.

On the other hand, the filter key providing means 62 is comprised of a filter key assigning table 67 holding preassigned filter keys (FK) corresponding to user authentication information (AI) and a filter key sending unit 66 for buffering a corresponding filter key FK from the filter key assigning table 67 in a transmitting buffer 68 once and sending it to the user when the veracity is confirmed. Note that an example of the table 67 is given next.

Figure 18:
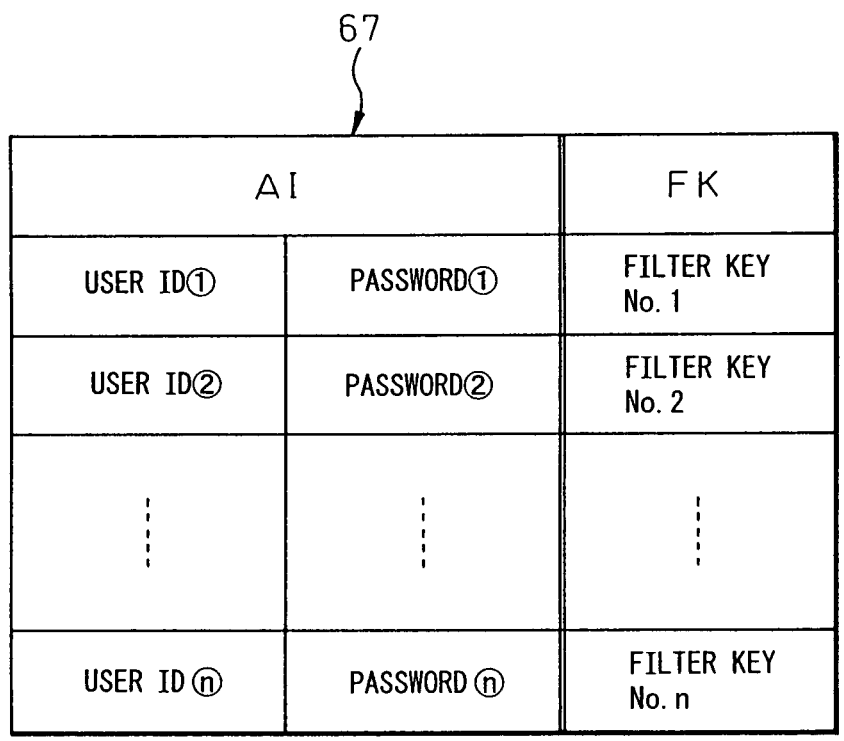
FIG. 18 is a view of an example of a filter key assigning table 67 of FIG. 17.

FIG. 18 is a view of an example of a filter key assigning table of FIG. 17.

The above user authentication information AI is for example a user ID and password. It would be convenient to the user if using a code or number which the user is familiar with.

The left column AI of the table 67 records user ID's and passwords preset for a predetermined plurality of users. On the other hand, the right column records numbers etc. of filter keys assigned corresponding to the user ID's and passwords.

When the decision unit 17 of FIG. 17 refers to the user authentication database 65 where authentication information AI having a content similar to the left column AI of this table 67 is recorded and judges that AI input as shown at the top left of FIG. 17 matches with an AI in the database 65, the matching AI (for example, the second AI of the AI column of FIG. 18) is input to the filter key sending unit 66. This sending unit 66 takes out the second filter key (in this example, No. 2) corresponding to the AI from the filter key assigning table 67 and provides it to the user side.

Figure 19:
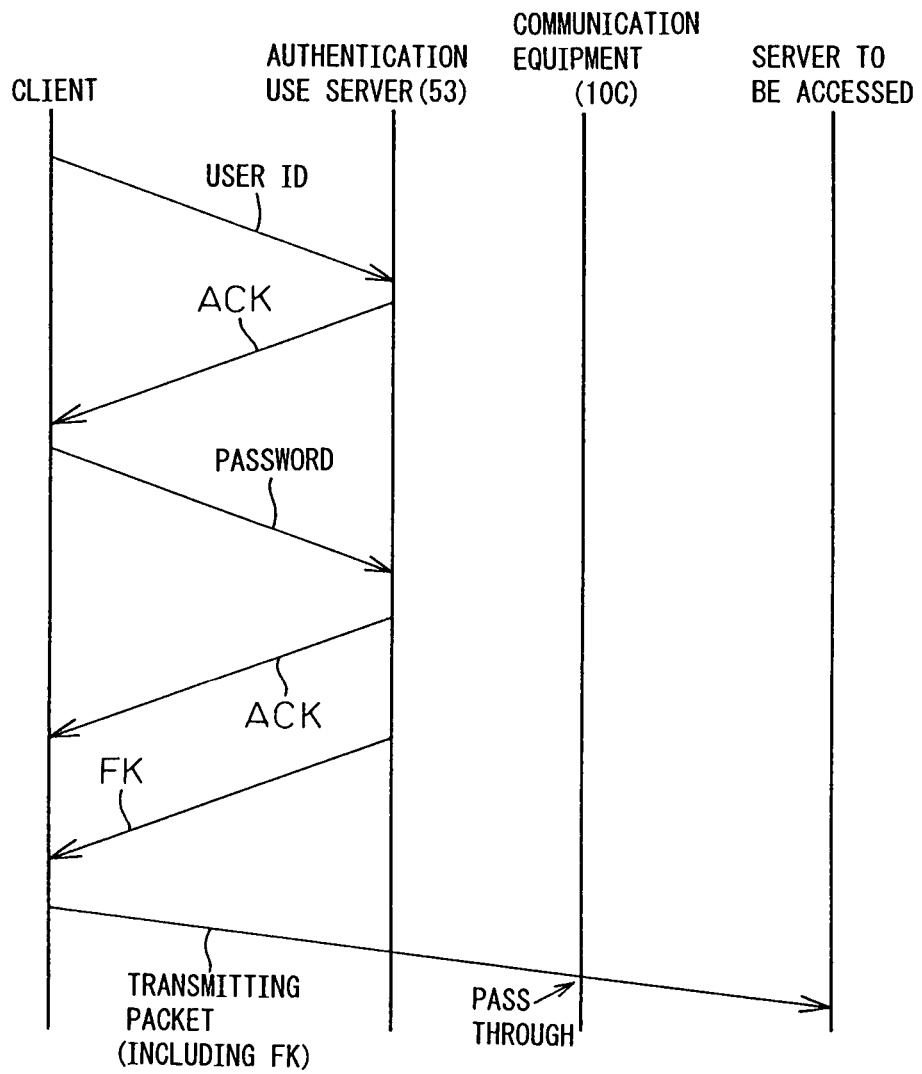
FIG. 19 is a sequence diagram showing a series of procedures for providing a filter key.

The above series of procedures for providing a filter key can be illustrated as follows:

FIG. 19 is a sequence diagram showing a series of procedures for providing a filter key.

The sequence shown in this figure will be easy to understand if assuming the network configuration shown in the already explained FIG. 8. FIG. 8, however, does not show at all the hardware/software relating to the authentication apparatus 53. The authentication apparatus 53 may however be present somewhere in FIG. 8. That is, the authentication apparatus 53 can be located anywhere in FIG. 8.

If speaking more specifically, the authentication apparatus 53 can be built inside at least one of an authentication use server, firewall, router, and host. The sequence of FIG. 19 shows the case of making the authentication apparatus 53 an independent authentication use server.

In FIG. 19, first, procedures for authentication relating to the user ID and password are successively performed between the client (user) and authentication server (53).

If the filtering authentication means 61 and a filter key providing means 62 shown in FIG. 17 etc. are used for authentication at the authentication use server and the corresponding filter key FK is distributed from the authentication server to the client, the client sends transmission packets in which the filter key FK is embedded toward the server being accessed. In this case, the filter key FK passes through the above authentication, so is valid. It passes through communication equipment (for example, 10c in FIG. 8). The transmitted packets can therefore reach the target server (right end).

Note that the above procedure may also be performed by the WWW.

In actually using the filtering method and apparatus according to the present invention, it is also necessary to study how to specifically set the above filter key. Several suitable examples of this will be given below:

a) Use of port number of TCP or UDP as filter key FK

Figure 25:
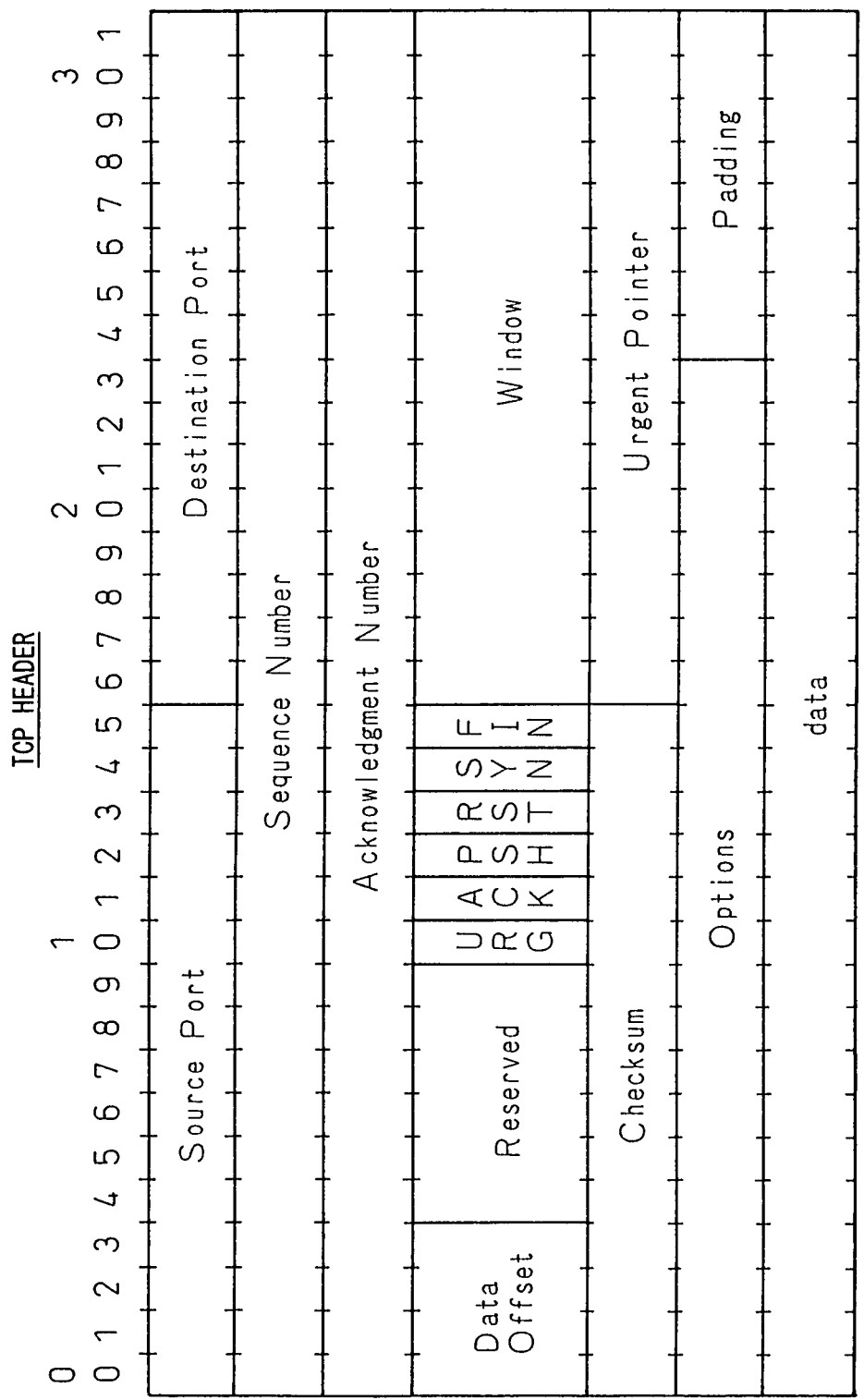
FIG. 25 is a view of the format showing the actual content of a TCP header.
Figure 26:
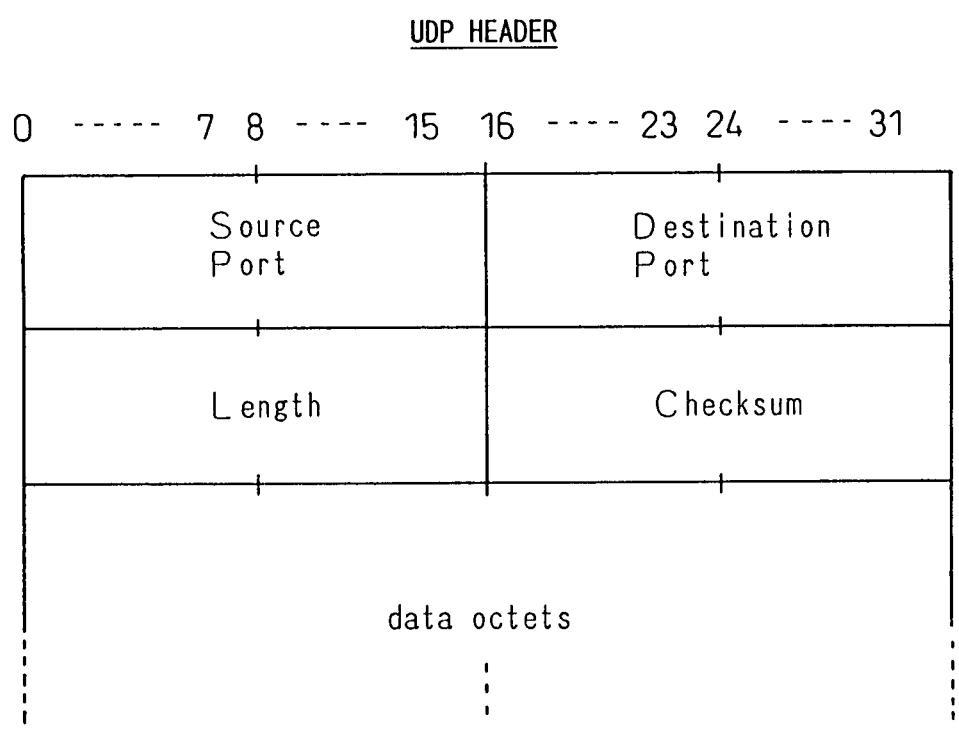
FIG. 26 is a view of the format showing the actual content of a UDP header.

Note that the TCP and UDP are as explained in FIG. 2 to FIG. 6 and in FIG. 25 and FIG. 26. In particular, the port numbers of the TCP and UDP are shown in FIG. 25 and FIG. 26 as the source port number and destination port number.

The port number used generally shows the units of service such as file transfer and Web. In the present invention, a copy of the port number is used as the filter key. Therefore, for example, the filter key is embedded in the extended region as FK as shown in FIG. 7.

If using the port number as the filter key as it is in this way, even when encrypting by IPsec explained above, filtering for each application can be performed with no obstruction.

b) Making value showing VoIP negotiated among users the filter key FK when using the above-mentioned VoIP for the communication among users The above mentioned file transfer, Web, etc. is unambiguously specified by the port number, but the application cannot be specified by the port number in this way for VoIP.

Therefore, before starting VoIP communications, the users have to specify dynamically that the communication is VoIP. For this, the value showing the VoIP negotiated between the users is embedded like in the filter key FK of FIG. 7, so as to enable the filtering of the VoIP as well.

In this case, the value showing the VoIP simultaneously acts to enable the communication partner to recognize the VoIP and acts for filtering according to the present invention.

c) Making a personal ID the filter key FK when users are assigned personal ID's individually under certain specific conditions As specific examples of such personal ID's, there are registration numbers (serial numbers) showing software licenses, employee numbers of individual companies, etc.

In general, the registration number of software is effective in preventing illegitimate access to the server I from a malicious user when a new version of software is provided by a software manufacturer from the server to a user and is authentication information (AI) frequently routinely used. This is convenient for use as a filter key as well.

Further, in general, an employee number is allotted to an individual employee in a company, so this is also convenient for use as a filter key.

The settings (a), b) and c)) of the filter key explained above utilize existing codes, numbers, etc. as they are as filter keys. However, by newly defining and applying this filter key, it is possible to realize a packet communication service never before seen. Examples are shown in the following 1) and 2):

1) Presetting a shared ID specifying a group and making the shared ID the filter key when users are users belonging to a certain group.

The "group" spoken of here is for example a group forming a conference of an academic society or company in which a large number of users get together.

For example, if providing a service wherein only a user participating in the above conference can access the Internet or other outside network using this conference network as an access network, the value of the conference can be enhanced.

In this case, the conventional filtering technique was to set separate filter conditions (see FIG. 22) individually for individual users participating in the above conference. This however is complicated and troublesome.

Therefore, by using the present invention, a single shared ID is set for all the participating members specifying the above conference. This shared ID is distributed to all of these members in advance. By doing this, it is possible to perform filtering in group units (for each conference) extremely simply.

2) Making a user ID notified in advance to only a user allowed to use content provided by multicast packets the filter key FK when multicast packets are distributed simultaneously to a plurality of users.

For example, when a movie distributor simultaneously distributes a movie to a large number of users, multicast packets can be used. The multicast packets, however, reach all users insofar as there is no other gate means and therefore the content ends up being provided free of charge.

Therefore, by using the present invention, it becomes possible to selectively provide content to only users paying a reception fee extremely simply.

That is, as the above filter key FK, use is made of the same user ID commonly notified to only users allowed to use the above content (movies etc.), that is, users paying a reception fee. By doing this, only users which know the user ID can use the content. Note that the means for notification may be the Web, telephone, or facsimile.

If further developing the above modes of use, if preparing a plurality of types of common user ID's and individually assigning the user ID's to the plurality of types of movie programs offered by the above movie distributor, it is possible to distribute the desired movies to only users paying a reception fee for each movie program.

Finally, an explanation of the case of use of packets of IPv6 in the figure referring again to the above-mentioned FIG. 15 may be added as follows: However, the content is the same as that already explained using FIG. 5 and FIG. 7. That is, when the packet PKT is a packet in compliance with IPv6, the filtering information is stored in the extended header of the IPv6.

Similarly, when the packet PKT is a packet in compliance with IPv6, the filtering information is stored in the flow label region in the IPv6 header.

The embodiments of the present invention explained above are as shown in the following appendices:

(Appendix 1) A packet filtering method characterized by storing filtering information for use in filtering at a receiving side in a packet to be sent to the receiving side and sending it from a sending side.

(Appendix 2) A packet filtering method characterized by receiving a packet from a sending side, detecting filtering information stored in that packet, and using it for filtering at a receiving side.

(Appendix 3) A packet filtering method as set forth in appendix 2, characterized by having the receiving side hold predetermined filtering information of the receiving side, compare filtering information of the sending side detected from the packet with the filtering information of the receiving side, and, when the two do not match, discard that packet.

(Appendix 4) A packet filtering method as set forth in appendix 1 or 2, characterized by storing the filtering information in an IPv6 header portion when the packet is a packet in compliance with IPv6.

(Appendix 5) A packet filtering method as set forth in appendix 1 or 2, characterized by storing the filtering information in an IPv6 extended header added to an IPv6 header when the packet is a packet in compliance with IPv6.

(Appendix 6) A packet filtering method as set forth in appendix 1 or 2, characterized by storing the filtering information in a flow label region in an IPv6 header when the packet is a packet in compliance with IPv6.

(Appendix 7) Communication equipment at a packet sending side including a function unit for achieving a packet filtering, the communication equipment characterized by having at least:

a setting unit for setting freely determined filtering information, a filter key holding unit for holding the filtering information input by the setting unit as a filter key, and a filter key storing function unit for receiving as input the held filter key and storing the filter key in a header portion of a packet.

(Appendix 8) Communication equipment as set forth in appendix 7, characterized in that when the packet is a packet in compliance with IPv6, the filter key storing function unit is a filter key header producing unit which forms a filter key header in an IPv6 extended header added to the IPv6 header.

(Appendix 9) Communication equipment as set forth in appendix 8, characterized by further having:

an encrypted header producing unit for generating an IPsec encrypted header, an upper layer header producing unit for generating a TCP header or UDP header, and a data generating unit for generating data to be transferred to the receiving side.

(Appendix 10) Communication equipment as set forth in appendix 9, characterized by further having a packet composing/encrypting unit for receiving as input the outputs of the filter key header producing unit, encrypted header producing unit, upper layer header producing unit, and data generating unit and generating a packet to the receiving side.

(Appendix 11) Communication equipment as set forth in appendix 7, characterized in that when the packet is a packet in compliance with IPv6, the filter key storage unit is an IPv6 header producing unit for storing the filter key in a flow label region in the IPv6 header.

(Appendix 12) Communication equipment as set forth in appendix 11, characterized by further having:

an encrypted header producing unit for generating an IPsec encrypted header, an upper layer header producing unit for generating a TCP header or UDP header, and a data generating unit for generating data to be transferred to the receiving side.

(Appendix 13) Communication equipment as set forth in appendix 12, characterized by further having a packet composing/encrypting unit for receiving as input the outputs of the filter key header producing unit, encrypted header producing unit, upper layer header producing unit, and data generating unit and generating a packet to the receiving side.

(Appendix 14) Communication equipment of a packet receiving side including a function unit for achieving a packet filtering, the communication equipment characterized by being provided with:

a filter key detecting unit for receiving a packet sent from a sending side while storing freely determined filtering information as a filter key in a header portion of the packet and detecting the filter key from the header portion and a comparing function unit for comparing a filter key of a sending side detected by the filter key detecting unit with a filter key of the receiving side held in advance, determining if the two do not match, and, when they do not match, discarding the received packet.

(Appendix 15) Communication equipment as set forth in appendix 14, characterized by forming a filter key header in an IPv6 extended header added to an IPv6 header when the packet is a packet in compliance with IPv6.

(Appendix 16) Communication equipment as set forth in appendix 14, characterized by storing the filter key header in a flow label region in an IPv6 header when the packet is a packet in compliance with IPv6.

(Appendix 17) Communication equipment as set forth in appendix 14, characterized in that:

the equipment is provided with a buffer for temporarily storing a received packet passing through the filter key detecting unit and in that the comparing function unit is comprised of:

a filter key table holding a predetermined plurality of different filter keys, a search unit for searching if there is a filter key matching with a filter key detected by the filter key detecting unit in the filter key table and when there is none, outputting a discard command, and a buffer control unit for receiving the discard command and controlling the system so as to discard the packet stored in the buffer.

(Appendix 18) An authentication apparatus having:

a filtering authentication function unit for receiving user authentication information input from a user receiving a filtering service and authenticating the user and a filter key providing function unit for assigning and distributing a filter key as filtering information corresponding to the user authentication information to the user after the authentication at the filtering authentication function unit.

(Appendix 19) An authentication apparatus as set forth in appendix 18, characterized in that:

the filtering authentication function unit has:

a user authentication database in which user authentication information is registered in advance and a decision unit for determining the veracity of the input user authentication information by referring to the user authentication database and the filter key providing function unit has:

a filter key assigning table holding a filter key assigned in advance corresponding to user authentication information and a filter key sending unit for sending a corresponding filter key from the filter key assigning table to the user when the veracity is confirmed.

(Appendix 20) An authentication apparatus as set forth in appendix 18, characterized in that the authentication apparatus is built in at least one of an authentication use server, firewall, router, and host.

(Appendix 21) An authentication apparatus as set forth in appendix 18, characterized in that the user authentication information is a user ID and password.

(Appendix 22) An authentication apparatus as set forth in appendix 18, characterized by using a TCP or UDP port number as the filter key.

(Appendix 23) An authentication apparatus as set forth in appendix 18, characterized by making a value showing a VoIP negotiated between users as the filter key when communicating among users by using VoIP.

(Appendix 24) An authentication apparatus as set forth in appendix 18, characterized by making a personal ID the filter key when a personal ID is assigned individually to a user under certain specific conditions.

(Appendix 25) An authentication apparatus as set forth in appendix 18, characterized by determining in advance a shared ID specifying a group and making that shared ID the filter key when the user is a user belonging to a certain group.

(Appendix 26) An authentication apparatus as set forth in appendix 18, characterized by making a user ID notified in advance to only a user allowed to use content provided by a multicast packet as the filter key when a multicast packet is distributed at the same time to a plurality of users.

(Appendix 27) An authentication apparatus as set forth in appendix 18, characterized by storing the filtering information in an IPv6 extended header when the packet is a packet in compliance with IPv6.

(Appendix 28) An authentication apparatus as set forth in appendix 18, characterized by storing the filtering information in a flow label region in an IPv6 header when the packet is a packet in compliance with IPv6.

(Appendix 29) A packet communication system where a transferred packet is filtered, the packet communication system characterized by being provided with:

a packet transmitting apparatus for storing filtering information for use in filtering at a receiving side in a packet to be sent to the receiving side and sending it from a sending side, a packet receiving apparatus for receiving a packet from the sending side through a network between a server and client, detecting filtering information stored in the received packet, and using it for filtering at the receiving side, and an authentication apparatus for receiving user authentication information input from a user receiving the filtering service, authenticating the user, and assigning and distributing a filter key as filtering information corresponding to the user authentication information to the user after the authentication.

(Appendix 30) A packet communication system where a filtering service is provided for a packet transferred through a network between a server and a client, the packet communication system characterized by being provided with:

function units used for access from the server or client of the user side to the network, that is, a first function unit for receiving user authentication information and authenticating the user and a second function unit for restricting access by assigning and distributing a filter key as filtering information corresponding to the user authentication information to the user after the authentication.

(Appendix 31) A packet communication system where a filtering service is provided for a packet transferred through a network between a server and a client, the packet communication system characterized by being provided with:

function units used for access from a user on a network side to the server or client, that is, a first function unit for receiving user authentication information and authenticating the user and a second function unit for restricting access by assigning and distributing a filter key as filtering information corresponding to the user authentication information to the user after the authentication.

As explained above, according to the present invention, the following effects are obtained:

(1) The table showing the filter conditions need only store the filter keys. Further, the filter keys do not correspond to the users (that is, correspond to IP addresses of all related terminals). It is possible to set them in correspondence with specific groups. Therefore, setting of filter keys in the table, that is, entries, is greatly streamlined. Further, the required memory capacity of the table can be greatly reduced.

In the past, as clear from the explanation of the filter conditions shown in FIG. 22, there is a large variety of filter condition data, so the conditions for comparison (ADD or OR) become complicated, but in the present invention, as explained above, the table stores only the filter keys. Thus, the logical processing for comparison is strikingly streamlined. Therefore, the filtering is greatly increased in speed.

(2) If the IPsec protocol is introduced, conventional packet filtering using the filter conditions in the TCP header or UDP header becomes impossible due to encryption of the headers, but according to the present invention, even if the TCP header or UDP header is encrypted, the filter key is removed from the coverage of the encryption, as shown in FIG. 6, so there is no obstacle at all to packet filtering.

Therefore, if dealing with an application where the value of the port number becomes unstable or if the value of the port number becomes unclear due to encryption, it is possible to perform filtering which does not prohibit pass through of all of the packets and to discard packets other than the necessary packets.

(3) Packet filtering can easily be applied even to applications such as VoIP which has been difficult in the past.

(4) Packet filtering in units of groups such as academic societies, conferences, etc. in which large number of users participate can be easily performed.

(5) Selective distribution to users corresponding to payment of fees for receiving multicast content such as distribution of movies can be performed simply.

The invention claimed is:

1. A packet communication system performing a VoIP communication, at least, therein where a transferred packet is filtered, said packet communication system comprising:
a hardware processor performing functionality of:
authentication comprising filtering authentication and filter key providing, the filtering authentication is configured to receive user authentication information input from a user receiving a filtering service and authenticate the user, the filter key providing is configured to assign and distribute a filter key as filtering information corresponding to the user authentication information to the user after authentication by the filtering authentication;
packet transmitting, at a sending side, to receive the filter key distributed from the filter key providing for identifying a specific value showing a VoIP performing a VoIP communication, embed the received filter key in an IPv6 extended header added to an IPv6 header or in a flow label region in an IPv6 header of the transferred packet to prevent the filter key from being encrypted by an IPsec, encrypt the packet except for the header and transmit the packet with the filter key to a receiving side; and
packet receiving, at the receiving side, to receive the encrypted packet, except for the filter key, from the sending side through a network between a server and a client, hold a filter key at the receiving side and compare the held filter key with the filter key detected from the received packet at the receiving side by comparing the held filter key with keys of a table.

\* \* \* \* \*